No. 622,032. Patented Mar. 28, 1899.
E. BAKER.
BICYCLE PEDAL.
(Application filed Mar. 16, 1896.)

(No Model.)

WITNESS:

INVENTOR
EUGENE BAKER
BY
Casper L. Redfield
ATTORNEY.

UNITED STATES PATENT OFFICE.

EUGENE BAKER, OF CHICAGO, ILLINOIS, ASSIGNOR TO HENRY W. GILBERT, OF SAME PLACE.

BICYCLE-PEDAL.

SPECIFICATION forming part of Letters Patent No. 622,032, dated March 28, 1899.

Application filed March 16, 1896. Serial No. 583,462. (No model.)

*To all whom it may concern:*

Be it known that I, EUGENE BAKER, a citizen of the United States, residing at Chicago, in the county of Cook and State of Illinois, have invented certain new and useful Improvements in Bicycle-Pedals, of which the following is a specification.

My invention relates to the class of pedals shown and described in my pending application, Serial No. 575,996, filed January 18, 1896, and has for its object improvement in the construction of the pedal therein shown. The principal object of this kind of pedal is to provide means for holding the foot to the pedal, so that it will not be too difficult to release it in case of an unexpected fall. This is accomplished by constructing the pedal with a spring-clamp adapted to engage the sole of the shoe.

Figure 1:
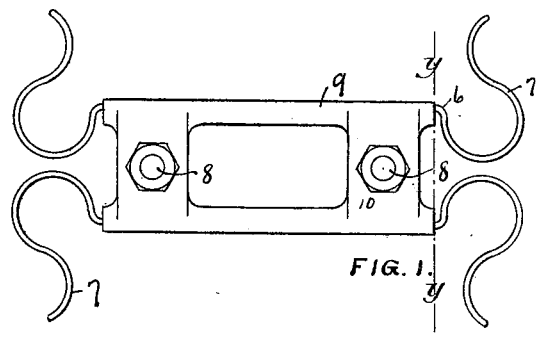
Figure 2:
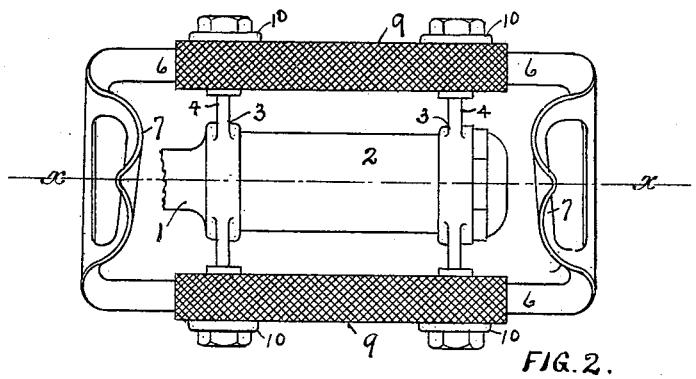
Figure 3:
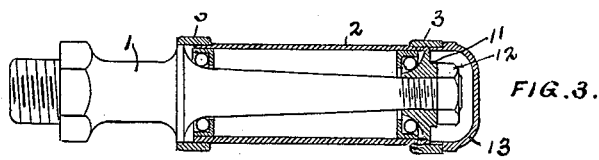
Figure 4:
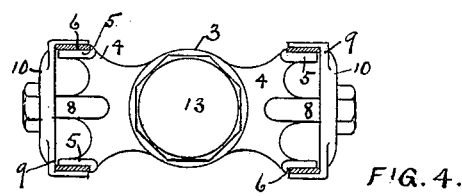
Figure 5:
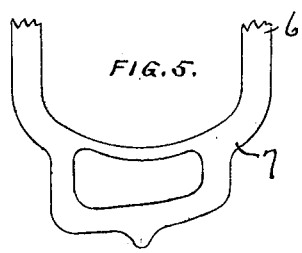

In the accompanying drawings, Figure 1 is a side elevation. Fig. 2 is a plan. Fig. 3 is a section on line X X of Fig. 2. Fig. 4 is a section on line Y Y of Fig. 1, and Fig. 5 is a detail of a spring-clamp before bending.

In the said drawings, 1 is a spindle, on which revolves a central shell formed of the tubing 2, the nuts 3, and the interior raceways for the ball-bearings, all of which are constructed as shown in Fig. 3. On each side of the nuts 3 are arms 4, which are provided with shouldered shelves 5 for receiving the arms 6 of the spring-clamps 7. Between each pair of shelves 5 and solid with the arms 4 are the studs 8, which serve to tighten the side pieces 9 against the arms 6 and hold them at any desired position. The side pieces 9 are bent into the form of a channel, the flanges of which lap over the arms 6, so as to inclose them on the sides not inclosed by the shelves 5. This construction is more particularly shown in Fig. 4. The outside faces of the flanges on the side pieces 9 are corrugated or roughened, as shown in Fig. 2, and serve as the tread of the pedal. That part of the side pieces 9 through which the studs 8 pass is bulged out, as shown at 10, for the purpose of making a semiyielding seat for the nuts on the said studs. This construction has a tendency to prevent the said nuts from working loose. It will be readily understood that by loosening the nuts on the studs 8 the pressure of the side pieces 9 on the arms 6 will be relieved and the spring-clamps 7 may be moved out or in to increase or decrease the distance between them to suit the width of the sole of the shoe of the rider.

One half of each raceway for the ball-bearings is secured to the inner face of the tubing 2, and the other half of the said raceways is formed at one end by the spindle 1 and at the other end by a steel piece 11, held in place by the nut 12. A cap 13 screws into the nut 3 and serves both as a finish and a means of excluding dust.

The side pieces 9 are made of sheet-steel stamped up into the form shown in the drawings.

The clamps 7 are made of spring-steel stamped out and bent into the proper form. For the purpose of securing the taper shown in Fig. 2 to conform approximately to the taper of the sole of a shoe the original blank is not stamped out symmetrically with regard to the central axis, but is slightly larger on one side than the other, as shown in Fig. 5.

What I claim is—

1. A bicycle-pedal provided with channeled side pieces the flanges of which serve as a tread, spring-clamps supported by said pedal and held in position by said pieces at any required adjustment, and screws for securing said side pieces.

2. In bicycle-pedals, a central shell provided with laterally-projecting arms, spring-clamps supported on said arms and held in position by channeled side pieces also supported by said arms, and means for permitting the adjustment of said spring-clamps.

3. In bicycle-pedals, a central shell provided with laterally-projecting arms, clamps supported on said arms, channeled side pieces also supported on said arms, a tread formed on the flanges of said side pieces, screws for securing said side pieces to said arms, and means whereby said side pieces will hold said clamps at any required adjustment.

4. In pedals, shouldered shelves carried by the central shell, spring-clamps supported on said shelves, flanged side pieces overlapping the arms of said clamps, and means for tightening said side pieces on said arms.

5. In combination with a pedal-body, channeled side pieces serving as a tread for said pedal, screws for securing said side pieces to said body, and bulging seats on said side pieces for said screws.

EUGENE BAKER.

Witnesses:
CASPER L. REDFIELD,
MINNIE F. FRANK.